(12) United States Patent
Zhang et al.

(10) Patent No.: US 10,686,381 B1
(45) Date of Patent: Jun. 16, 2020

(54) SYNCHRONOUS BOOST REGULATOR CIRCUIT WITH PASS-THROUGH OPERATION CONTROL

(71) Applicant: Analog Devices International Unlimited Company, Limerick (IE)

(72) Inventors: Bin Zhang, Grass Valley, CA (US); Eric Stephen Young, Apex, NC (US); Bryan Avery Legates, Los Altos, CA (US); Mark William Marosek, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/287,918

(22) Filed: Feb. 27, 2019

(51) Int. Cl.
  *H02M 3/158* (2006.01)
  *H02M 1/00* (2006.01)

(52) U.S. Cl.
  CPC .. *H02M 3/1588* (2013.01); *H02M 2001/0032* (2013.01)

(58) Field of Classification Search
  CPC .......... H02M 3/155–1588; H02M 2001/0045; H02M 2001/0032
  See application file for complete search history.

(56) References Cited

U.S. PATENT DOCUMENTS

| | | | |
|---|---|---|---|
| 5,602,462 A | 2/1997 | Stich et al. | |
| 7,977,816 B2 | 7/2011 | Wei | |
| 8,330,435 B2 | 12/2012 | Qiu et al. | |
| 8,436,592 B2 | 5/2013 | Saitoh | |
| 8,957,644 B2 | 2/2015 | Mao et al. | |
| 8,981,737 B2 | 3/2015 | Huang et al. | |
| 9,122,287 B2 | 9/2015 | Mao et al. | |

(Continued)

FOREIGN PATENT DOCUMENTS

| EP | 1508960 A2 | 2/2005 |
|---|---|---|
| KR | 101315928 B1 | 10/2013 |
| WO | WO-2015161138 A1 | 10/2015 |

OTHER PUBLICATIONS

"LM5122ZA: Wide-Input Synchronous Boost Controller With Multiple Phase Capability", Texas Instruments Datasheet, (2018), 50 pgs.

(Continued)

*Primary Examiner* — Daniel Kessie
*Assistant Examiner* — Peter M Novak
(74) *Attorney, Agent, or Firm* — Schwegman Lundberg & Woessner, P.A.

(57) ABSTRACT

In some boost converter applications, an input voltage normally exceeds a regulated output voltage. The operation of the boost converter in this condition can be referred to as a pass-through operation. Using various techniques, the efficiency of a pass-through operation of a synchronous boost regulator circuit can be greatly improved. For example, a synchronous boost regulator circuit can include an input voltage $V_{IN}$ to output voltage $V_{OUT}$ voltage comparator that can accurately monitor the output voltage to detect the pass-through operation. In a pass-through operation, the high-side switch can be kept ON to maintain high efficiency, and the quiescent current of the regulator circuit can be minimized by setting portions of the control circuit into a sleep mode.

20 Claims, 6 Drawing Sheets

(56) References Cited

U.S. PATENT DOCUMENTS

| | | | |
|---|---|---|---|
| 9,136,756 | B2 | 9/2015 | Liu |
| 9,343,967 | B2* | 5/2016 | Shao ............... H02M 3/158 |
| 9,942,956 | B1 | 4/2018 | Chen et al. |
| 10,027,223 | B1 | 7/2018 | Zhang et al. |
| 2006/0055384 | A1* | 3/2006 | Jordan ............. H02M 3/158 |
| | | | 323/282 |
| 2011/0037446 | A1* | 2/2011 | Engelhardt ....... H02M 3/1582 |
| | | | 323/282 |
| 2014/0152272 | A1 | 6/2014 | Bazzani et al. |
| 2015/0160668 | A1* | 6/2015 | Pujol ............... G05F 1/565 |
| | | | 323/280 |
| 2017/0077818 | A1 | 3/2017 | Werner et al. |
| 2017/0279359 | A1 | 9/2017 | Goncalves et al. |

OTHER PUBLICATIONS

"LT3758/LT3758A: High Input Voltage, Boost, Flyback, SEPIC and Inverting Controller", Analog Devices/Linear Technology Datasheet, (2019), 38 pgs.

"LT8361: Low Iq Boost/SEPIC/ Inverting Converter with 2A, 100V Switch", Analog Devices/Linear Technology Datasheet, (2018), 28 ogs.

"LTC3525D-3.3: 400mA Micropower Synchronous Step-Up DC/DC Converter with Pass Through Mode", Linear Technology Datasheet, (2006), 14 pgs.

"LTC3769: 60V Low Iq Synchronous Boost Controller", Linear Technology Datasheet, (2014), 32 pgs.

"LTC3897: PolyPhase(TM) Synchronous Boost Controller with Input/ Output Protection", Linear Technology Datasheet, (2016), 50 pgs.

"RT4803A: 2.5MHz, Synchronous Boost Regulator with Bypass Mode", Richtek Technology Datasheet, (Aug. 2017), 22 pgs.

"TPS61099: Synchronous step-up converter", Texas Instruments Datasheet, w/ Japanese and English, (Dec. 2017), 39 pgs.

"TPS61253A 3.8-MHz, 5-V / 4-A Boost Converter in 1.2-mm x 1.3-mm WCSP", Texas Instruments Datasheet, (Dec. 2017), 31 pgs.

"XCL101Series: Inductor Built-in Step-up "micro DC/DC" Converter", Torex Semiconductor Datasheet, (2014), 19 pgs.

Mullett, Charles E., "Bimodal DC-DC Converter With an Efficient Pass-Through Zone", 20th IEEE Applied Power Electronics Conference and Exposition (APEC), Austin, TX, (Mar. 2005), 4 pgs.

Yu, Yangwei, "Choosing the Boost With Bypass or Pass Through", Texas Instruments Application Report, SLVA897, (Jun. 2017), 10 pgs.

* cited by examiner

SYNCHRONOUS BOOST REGULATOR CIRCUIT WITH PASS-THROUGH OPERATION CONTROL

FIELD OF THE DISCLOSURE

This document pertains generally, but not by way of limitation, to switch mode power converters and, more particularly, to boost regulator circuits.

BACKGROUND

One of the most common challenges in designing portable electronic devices is the generation and maintenance of a regulated voltage from an unregulated voltage source, such as a battery. Typically, a voltage regulator is used for this purpose. A voltage regulator may be designed as a linear regulator or a switching regulator.

A linear regulator provides closed loop control to regulate the voltage at the load. This type of regulator may be used to provide a constant output voltage that has a lower magnitude than the unregulated voltage source.

In contrast, a switching regulator uses an energy-storage element, such as an inductor, to transfer energy from the unregulated power source to the load in discrete bursts. Feedback circuitry may be used to regulate the energy transfer to maintain a constant voltage at the load. Because the switching regulator operates to transfer energy in discrete bursts, it can be configured to step-up or step-down the voltage of the unregulated voltage source. Moreover, switching regulators are generally more efficient than linear regulators.

Various types of switching regulators are commonly used today in portable electronic devices. A buck converter is an inductor-based regulator used to step-down or buck the unregulated voltage source. A boost converter or boost regulator is an inductor-based regulator used to step-up or boost the unregulated voltage source. In some applications, a buck-boost converter may be used to provide a regulated output that is higher, lower or the same as the unregulated voltage source.

SUMMARY OF THE DISCLOSURE

In some boost converter applications, an input voltage normally exceeds a regulated output voltage. The operation of the boost converter in this condition can be referred to as a pass-through operation. Using various techniques, the efficiency of a pass-through operation of a synchronous boost regulator circuit can be greatly improved. For example, a synchronous boost regulator circuit can include an input voltage $V_{IN}$ to output voltage $V_{OUT}$ voltage comparator that can accurately monitor the output voltage to detect the pass-through operation. In a pass-through operation, the high-side switch can be kept ON to maintain high efficiency, and the quiescent current of the regulator circuit can be minimized by setting portions of the control circuit into a sleep mode.

In some aspects, this disclosure is directed to a synchronous boost regulator circuit with pass-through operation control and low quiescent current and to supply a current at a regulated voltage to an output node coupled to a load. The synchronous boost regulator circuit comprises a power stage circuit coupled to supply the current to the output node, the power stage circuit including a low-side switch, a high-side switch, and an inductor. The synchronous boost regulator comprises a first comparator configured to compare a representation of an input node voltage and an output node voltage to generate a first control signal. The synchronous boost regulator comprises an error amplifier configured to receive a representation of the output node voltage and generate a current control signal to control an inductor current so as to maintain the output node at the regulated voltage. The synchronous boost regulator comprises a pass-through operation control circuit configured to control the high-side switch. The pass-through operation control circuit includes pass-through operation detection circuitry responsive to the first control signal and the current control signal and configured to generate a pass-through control signal indicating that the regulator circuit has entered or exited a pass-through operation. The pass-through operation control circuit includes sleep mode circuitry configured to receive the pass-through control signal and generate a sleep mode signal that causes at least one component to enter and exit a sleep mode, wherein entering the sleep mode reduces a quiescent current of the at least one component.

In some aspects, this disclosure is directed to a method of supplying a current at a regulated voltage to an output node coupled to a load using a synchronous boost regulator circuit with pass-through operation control and low quiescent current. The method comprises supplying the current to the output node using a power stage circuit including a low-side switch, a high-side switch, and an inductor. The method comprises comparing a representation of an input node voltage and an output node voltage and generating a first control signal. The method comprises receiving a representation of the output node voltage and generating a current control signal to control an inductor current so as to maintain the output node at the regulated voltage. The method comprises generating a pass-through control signal indicating that the regulator circuit has entered or exited a pass-through operation using the first control signal and the current control signal. The method comprises generating a sleep mode signal using the pass-through control signal to cause at least one component to enter and exit a sleep mode, wherein the sleep mode reduces a quiescent current of the at least one component.

In some aspects, this disclosure is directed to a synchronous boost regulator circuit with pass-through operation control and low quiescent current and to supply a current at a regulated voltage to an output node coupled to a load. The synchronous boost regulator circuit comprises a power stage circuit coupled to supply the current to the output node, the power stage circuit including a low-side switch, a high-side switch, and an inductor. The synchronous boost regulator circuit comprises a first comparator configured to compare a representation of an input node voltage and an output node voltage to generate a first control signal. The synchronous boost regulator circuit comprises an error amplifier configured to receive a representation of the output node voltage and generate a current control signal to control an inductor current so as to maintain the output node at the regulated voltage. The synchronous boost regulator circuit comprises means for generating a pass-through control signal indicating that the regulator circuit has entered or exited a pass-through operation using the first control signal and the current control signal. The synchronous boost regulator circuit comprises means for generating a sleep mode signal using the pass-through control signal to cause at least one component to enter and exit a sleep mode, wherein the sleep mode reduces a quiescent current of the at least one component.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In some boost converter applications, such as boost pre-regulator applications for automotive stop-start and cold crank, an input voltage normally exceeds a regulated output voltage. The operation of the boost converter in this condition can be referred to as a pass-through operation.

Using various techniques of this disclosure, the efficiency of a pass-through operation of a synchronous boost regulator circuit can be greatly improved. For example, a synchronous boost regulator circuit can include an input voltage $V_{IN}$ to output voltage $V_{OUT}$ voltage comparator that can accurately monitor the output voltage to detect the pass-through operation. In a pass-through operation, the high-side switch can be kept ON to maintain high efficiency, and the quiescent current of the regulator circuit can be minimized by setting portions of the control circuit into a sleep mode.

In addition, a sudden drop in the input voltage $V_{IN}$ can cause a reverse inductor current to begin ramping up, which can damage the voltage source and the load. This disclosure describes techniques to turn OFF the high-side switch and exit the pass-through operation when a sudden drop in the input voltage $V_{IN}$ occurs in order to protect the voltage source and the load.

Figure 1:
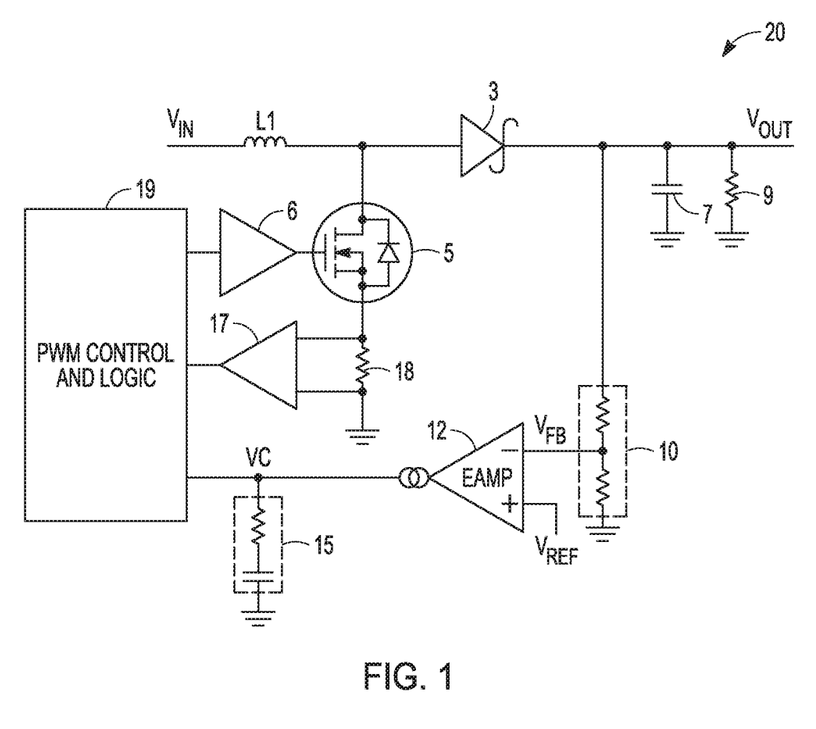
FIG. 1 is a schematic diagram of an example of a boost regulator circuit.

FIG. 1 is a schematic diagram of an example of a boost regulator circuit. The boost regulator circuit 20 can include an inductor L1, a diode 3, and a switch 5, e.g., a transistor, such as a field-effect transistor. When the pulse-width modulation (PWM) control and logic circuit 19 controls the switch 5 to close via driver circuit 6, an inductor current can increase through inductor L1 and the switch 5. When the control and logic circuit 19 controls the switch 5 to open, the input voltage $V_{IN}$ causes the inductor current to flow through the diode 3 and to a load that is coupled to an output node $V_{OUT}$, which charges up capacitor 7. The load can be represented as a resistor 9.

The inductor current through the inductor L1 can be measured using the voltage drop across the current sense element 18, which is received and amplified using a voltage amplifier 17. The voltage amplifier 17 can generate an output voltage that represents the inductor current. In this manner, a first feedback circuit can be formed at least by the voltage amplifier 17 and the PWM control and logic circuit 19 to monitor the inductor current and generate a feedback signal.

The boost regulator circuit 20 can further include an error amplifier (EAMP) circuit 12 configured to receive a representation of the output voltage $V_{OUT}$, such as determined by a voltage divider circuit 10 formed by resistors or other resistive components, for example. The representation of the output voltage $V_{OUT}$ is shown in FIG. 1 as a feedback voltage $V_{FB}$. In this manner, a second feedback circuit can be formed at least by the voltage divider 10 to monitor the output voltage and generate a feedback signal $V_{FB}$.

An output current of the EAMP 12 corresponds to a difference between the representation $V_{FB}$ of the actual output voltage $V_{OUT}$ and the regulated output voltage, which is set by a reference voltage $V_{REF}$ and applied to the EAMP 12. The EAMP 12 outputs a current that flows through a compensation network 15 to generate a control voltage VC (or current control signal).

In some boost converter applications, such as boost pre-regulator applications for automotive stop-start and cold crank, an input voltage normally exceeds a regulated output voltage. When the input voltage exceeds a regulated output voltage, the operation of the boost converter can be referred to as a pass-through operation. In a pass-through operation, the feedback voltage $V_{FB}$, which represents the output voltage $V_{OUT}$, is higher than the reference voltage $V_{REF}$, therefore the output voltage VC of the EAMP 12 is low.

The output voltage VC can be applied to the PWM control and logic circuit 19. In response, the PWM control and logic circuit 19 can control the low-side switch 5 to remain OFF. As a result, the input voltage $V_{IN}$ can be coupled to the output node $V_{OUT}$ by the inductor L1 and the diode 3. A disadvantage of circuit 20 of FIG. 1 is that the voltage drop across the diode 3 can reduce the efficiency of the converter. Another disadvantage is that the converter has high quiescent current in its pass-through operation.

Figure 2:
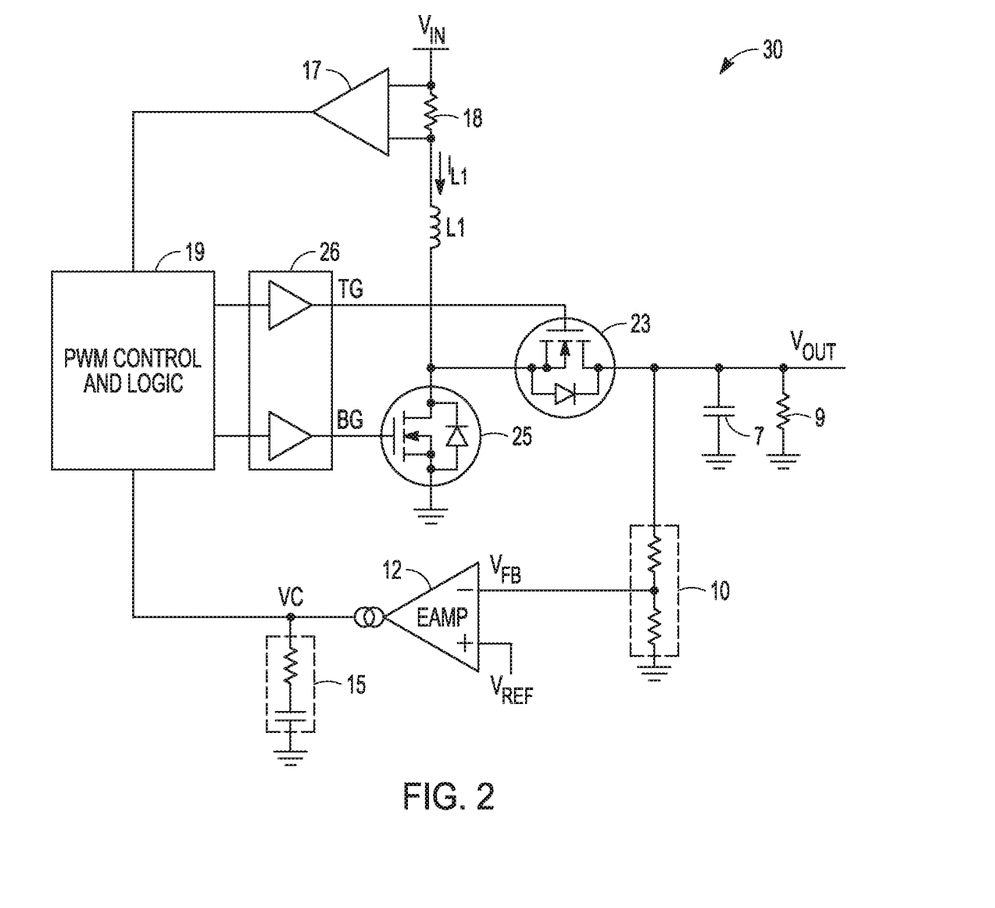
FIG. 2 is a schematic diagram of another example of a synchronous boost regulator circuit.

FIG. 2 is a schematic diagram of another example of a synchronous boost regulator circuit. Some of the components in FIG. 2 are similar to components in FIG. 1 and are labeled with similar reference numbers and, for purposes of conciseness, will not be described again. The boost regulator circuit 30 can include a high-side switch 23, e.g., a transistor, and a low-side switch 25, e.g., a transistor, coupled to a driver circuit 26.

In a pass-through operation, the feedback voltage $V_{FB}$ is higher than the reference voltage $V_{REF}$, therefore the output voltage VC of the EAMP 12 is low. The output voltage VC can be applied to the PWM control and logic block 19. In response, the PWM control and logic block 19 can control the low-side switch 25 to remain OFF. As a result, the input voltage $V_{IN}$ can be coupled to the output node $V_{OUT}$ by the inductor L and the high-side switch 23.

If the regulator circuit 30 operates in a forced continuous conduction mode in which the inductor current $I_{L1}$ is above zero amps, the low-side switch 25 and the high-side switch 23 can operate in a complementary manner, and the high-side switch 23 is ON when in a pass-through operation. Since the voltage drop across the high-side switch 23 is lower than the voltage drop across the diode as in FIG. 1, the efficiency of the circuit is greatly improved.

However, if the converter circuit 30 is not in forced continuous conduction mode, both the low-side switch 25 and the high-side switch 23 are OFF in the pass-through operation, and the current flowing through the high-side switch 23 is conducted by its body diode, which can reduce the efficiency of the converter. Another disadvantage is that the converter has high quiescent current in pass-through operation.

Figure 3:
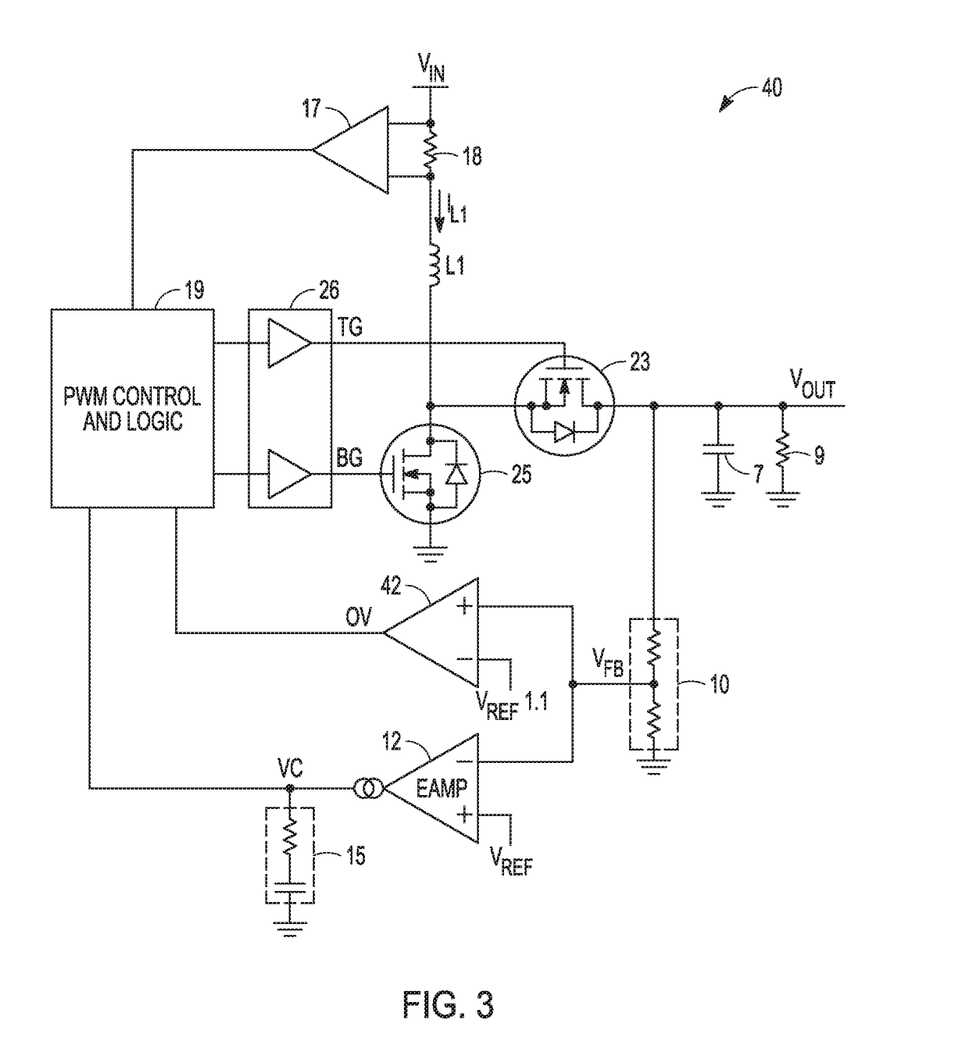
FIG. 3 is a schematic diagram of another example of a synchronous boost regulator circuit.

FIG. 3 is a schematic diagram of another example of a synchronous boost regulator circuit. Some of the components in FIG. 3 are similar to components in FIGS. 1 and 2 and labeled with similar reference numbers and, for purposes of conciseness, will not be described again.

The boost regulator circuit 40 of FIG. 3 can include a voltage comparator 42 that compares the feedback signal VF to 110% of the voltage reference $V_{REF}$, for example. The comparator 42 can output a logic low signal, e.g., a 0 volt (V) signal, for example, to the PWM control and logic circuit 19 when the output voltage $V_{OUT}$ exceeds 110% of the regulated output voltage. The logic low signal can indicate to the PWM control and logic circuit 19 that the converter 40 is in a pass-through operation. In response, the PWM control and logic circuit 19 can control the high-side switch 23 to turn ON via the driver circuit 26, and the voltage drop across the high-side switch 23 is greatly reduced.

The pass-through operation can maintain high efficiency when the output voltage $V_{OUT}$ exceeds 110% of the regulated output voltage $V_{REF}$. However, there can be some disadvantages to this technique. For example, when the output voltage $V_{OUT}$ falls within the range of 100% to 110% of the regulated output voltage and the boost regulator circuit is not in a forced continuous operation, the high-side switch 23 remains OFF and its body diode will conduct current, which reduces the efficiency of the circuit. Additionally, the scaled reference voltage setting of the comparator 42, e.g., 110% of the reference voltage $V_{REF}$, can cause an error: if the output voltage $V_{OUT}$ exceeds 110% of its regulated output voltage during a load step transient, the converter 40 can falsely enter the pass-through operation. Another disadvantage is that the converter has high quiescent current in pass-through operation.

Using various techniques of this disclosure, the efficiency of a pass-through operation of a synchronous boost regulator circuit can be greatly improved. For example, a synchronous boost regulator circuit can include an input voltage $V_{IN}$ to output voltage $V_{OUT}$ voltage comparator that can accurately monitor the output voltage to detect a pass-through operation. In the pass-through operation, the high-side switch can be kept ON to maintain high efficiency, and the quiescent current of the regulator circuit can be minimized by setting portions of the control circuit into a sleep mode, which is a mode in which a component uses a current that is less than a quiescent current. The converter can exit the pass-through operation when an inductor reverse current reaches to a threshold value (among other conditions), which can protect the input voltage source and the load.

Figure 4:
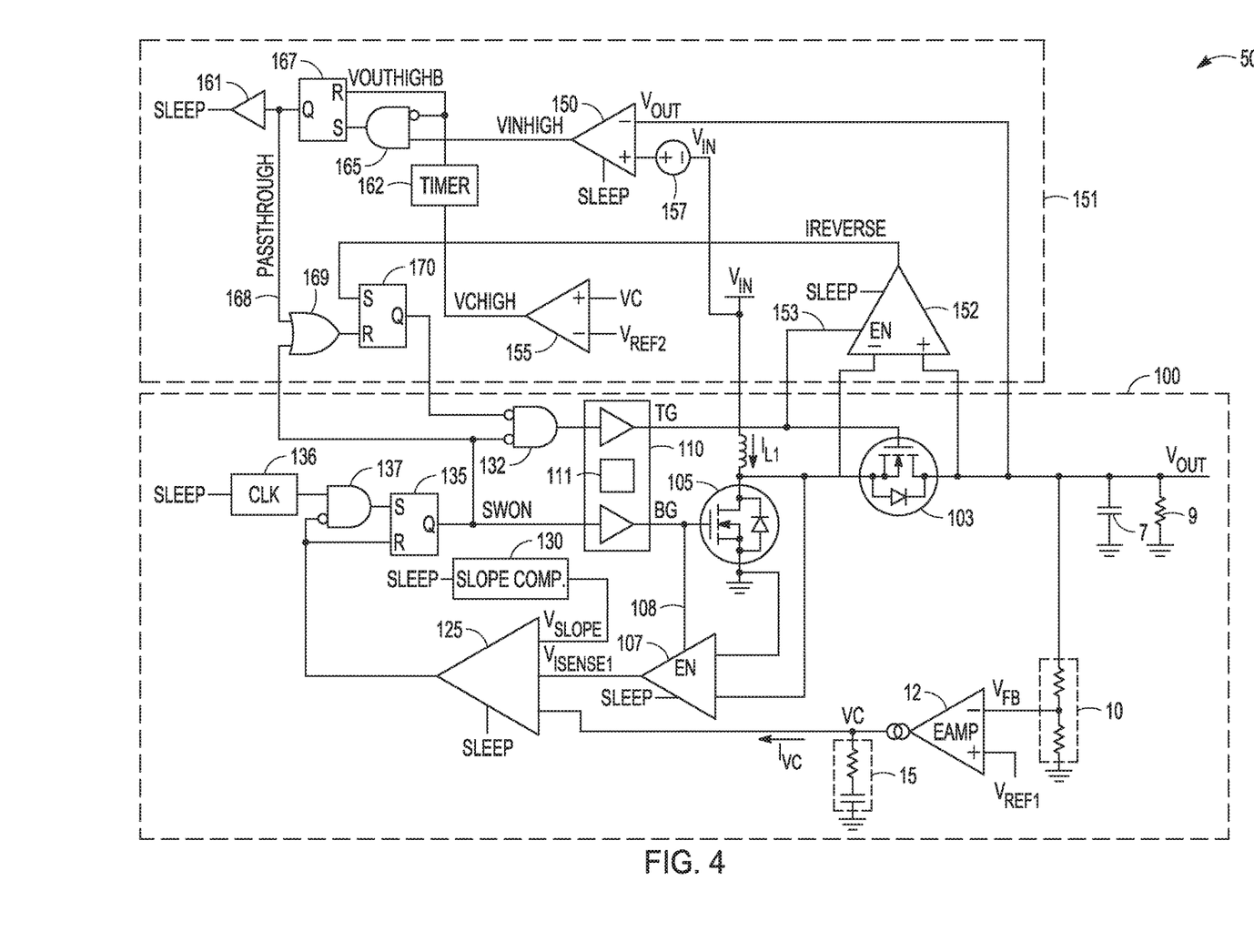
FIG. 4 is a schematic diagram of an example of a synchronous boost regulator circuit with accurate pass-through operation control and low quiescent current.

FIG. 4 is a schematic diagram of an example of a synchronous boost converter circuit with accurate pass-through operation control and low quiescent current. Some of the components in FIG. 4 are similar to components in FIGS. 1-3 and are labeled with similar reference numbers and, for purposes of conciseness, will not be described again. The boost regulator circuit 50 of FIG. 4 can include a boost circuit 100 and a pass-through operation control circuit 151. The boost circuit 100 can include a power stage circuit including an inductor L1, a high-side switch 103, and a low-side switch 105. The high-side switch 103 and the low-side switch 105 can be transistors, such as n-type field-effect transistors.

The voltage amplifier 107 can determine a voltage drop across the drain and the source terminals of the low-side switch 105 when it is turned ON, where the determined voltage can represent a current through the low-side switch 105. When the low-side switch 105 is turned OFF, the amplifier 107 can also be turned OFF by an enable pin 108. The low-side switch 105 and the high-side switch 103 can be controlled by a circuit 110, which can include a driver circuit, a level shift circuit, an anti-shoot through logic circuit, and a charge pump circuit for the high-side switch driver, for example.

The output current $I_{VC}$ of the error amplifier circuit (EAMP) 12 can correspond to a difference between the representation of the actual output voltage $V_{OUT}$ (in particular, the voltage $V_{FB}$ as sensed by voltage divider circuit 10) and the regulated output voltage ($V_{OUT\_REG}$), which can be set by the reference voltage $V_{REF1}$. The output current $I_{VC}$ flows through a compensation network 15 and generates a control voltage VC, also referred to as a current control signal as it can control the inductor current $I_{L1}$. The control voltage VC can be applied to a comparator 125. The comparator 125 can compare the control voltage VC to a sum of the low-side switch current sense signal $V_{ISENSE}$ (generated by the voltage amplifier 107) and a slope compensation signal $V_{SLOPE}$ (generated by a slope compensation circuit 130) and output a RESET signal.

When the input voltage $V_{IN}$ at the input node $V_{IN}$ is lower than the output voltage $V_{OUT}$ at the output node $V_{OUT}$, the converter circuit 50 can operate in its boost mode of operation. If the load 9 applies a high load current on the output voltage $V_{OUT}$, the switching frequency can be synchronized to the clock 136. In this condition and when the low-side switch 105 is OFF, the control VC can be higher than the sum of the voltage $V_{ISENSE}$ and the voltage $V_{SLOPE}$, which can cause the RESET output of the comparator 125 to be a logic-low level. The clock 136 can be applied to the S-input of an S-R flip-flop 135 through a logic gate 137 and the flip-flop 135 can output a logic-high signal (SWON high) to gate 132 and driver circuit 110. In response, the low-side switch 105 is turned ON and the high-side switch 103 is turned OFF.

The current $I_{L1}$ through inductor L1 ramps up and is sensed by the voltage amplifier 107. When the sum of the voltage $V_{ISENSE}$ and the voltage $V_{SLOPE}$ exceeds the control voltage VC, the comparator 125 flips and applies a logic-high RESET signal to the flip-flop 135. The flip-flop 135 outputs a logic-low signal (SWON low) to gate 132 and the driver circuit 110. In response, the low-side switch 105 is turned OFF and the high-side switch 103 is turned ON, thereby delivering the inductor current to the output node $V_{OUT}$. In this manner, the actual output voltage $V_{OUT}$ is maintained at the regulated output voltage $V_{OUT\_REG}$.

When high-side switch 103 is ON in the boost mode of operation, the inductor current $I_{L1}$ ramps down and the inductor current can be sensed by the comparator 152, which is coupled across the high-side switch 103. In other configurations, the comparator 152 can be configured to measure a voltage drop across a sense resistor connected in series with the inductor L1, such as shown in FIGS. 2-3. In an inductor current discontinuous operation, the inductor current $I_{L1}$ eventually decreases to zero amps, which can cause the comparator circuit 152 to output a logic-high signal IREVERSE to the S-input of the flip-flop 170. In response, the flip-flop 170 can output a logic-high signal to gate 132 and driver circuit 110 to turn the high-side switch 103 OFF. As a result, both the high-side switch 103 and the low-side switch 105 are OFF. In this manner, the comparator circuit 152 can monitor the inductor current $I_{L1}$ and generate a feedback signal IREVERSE that can control operation of the high-side switch 103, for example.

As described above, the boost regulator circuit 50 can further include an error amplifier (EAMP) circuit 12 configured to receive a representation of the output voltage $V_{OUT}$, such as determined by a voltage divider circuit 10 formed by resistors (or other resistive components), for example. The representation of the output voltage $V_{OUT}$ is shown in FIG. 4 as a feedback voltage $V_{FB}$. In this manner, a feedback circuit can be formed at least by the voltage divider 10 to monitor the output voltage and generate a feedback signal $V_{FB}$.

An output current of the EAMP 12 corresponds to a difference between the representation $V_{FB}$ of the actual output voltage $V_{OUT}$ and the regulated output voltage, which is set by a reference voltage $V_{REF}$ and applied to the EAMP 12. The output current $I_{VC}$ of the EAMP 12 flows through a compensation network 15 to generate a control voltage VC or current control signal. The control signal VC can be used to maintain the output node at the regulated voltage by controlling the inductor current $I_{L1}$.

In a boost light load operation, the output voltage $V_{OUT}$ can temporarily be higher than the regulated output voltage $V_{OUT\_REG}$. In these conditions, the control voltage VC can be pulled low by EAMP 12. As a result, the control voltage VC is lower than the sum of the voltage $V_{ISENSE}$ and the voltage $V_{SLOPE}$ even when the low-side switch 105 is OFF, which keeps the comparator output signal RESET high. The clock 136 is blocked by the logic gate 137 and the output of the flip-flop 135 remains low regardless of the clock 136 signal. In response, both the high-side switch 103 and the low-side switch 105 remain OFF for multiple switching cycles.

As mentioned above, the synchronous boost regulator circuit 50 of FIG. 4 includes a pass-through operation control circuit 151. The pass-through operation control circuit 151 can perform several important functions. First, the pass-through operation control circuit 151 can keep the high-side switch 103 ON using a pass-through control signal (PASSTHROUGH) applied via logic gate 169, an S-R flip flop 170, a logic gate 132, and the driver circuit 110.

Second, during the pass-through operation, the pass-through operation control circuit 151 can continue monitoring the output voltage $V_{OUT}$ using a comparator 155, can continue comparing the input voltage VIN and the output voltage $V_{OUT}$ using a comparator 160, and can continue monitoring the inductor current using the comparator 152. In addition, the pass-through operation control circuit 151 can be responsive to the comparator 155 to exit out of pass-through operation, and can be responsive to the comparators 160, 152 to turn OFF the high-side switch 103.

Third, the pass-through operation control circuit 151 includes circuitry that can put various components into a SLEEP mode to achieve low quiescent current.

The pass-through operation control circuit 151 can determine a pass-through operation using Equations (1) and (2) below:

$$V_{OUT} > V_{OUT\_REG} \qquad \text{Equation (1)}$$

$$V_{IN} > V_{OUT} \qquad \text{Equation (2)}$$

Figure 6:
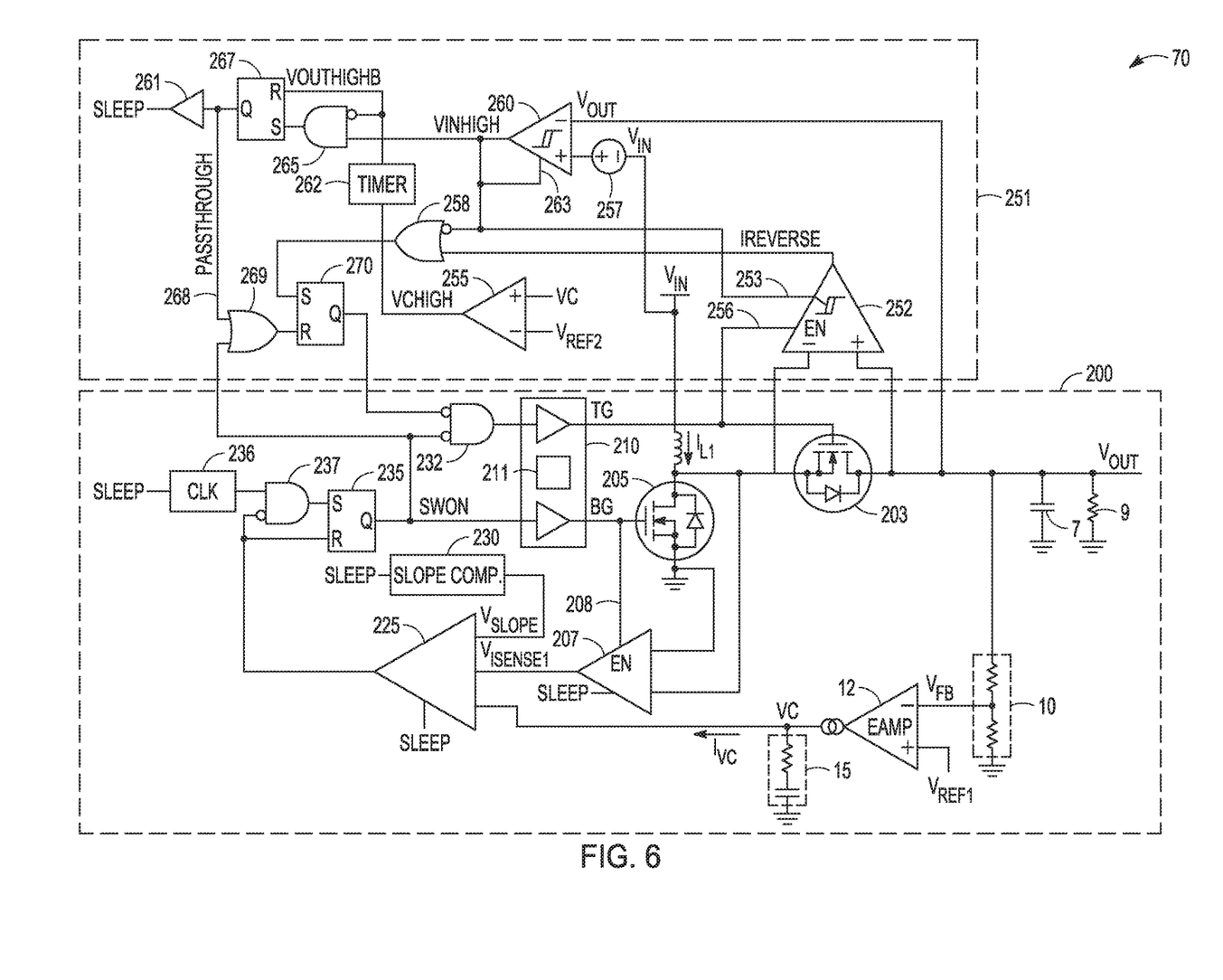
FIG. 6 is a schematic diagram of an example of a synchronous boost regulator circuit with accurate pass-through operation control, low quiescent current, and reverse inductor current protection.

The regulator circuits of FIGS. 4 and 6 can enter the pass-through operation and keep the high-side switch ON constantly when both Equation (1) and Equation (2) are satisfied.

Equation (1) can be implemented using a comparator 155 and a timer 162. The comparator 155 can compare the control voltage signal VC to a threshold voltage $V_{REF2}$ and generate a control signal VCHIGH. A logic-low level of the control signal VCHIGH indicates that the output node voltage is higher than the regulated voltage.

Figure 5:
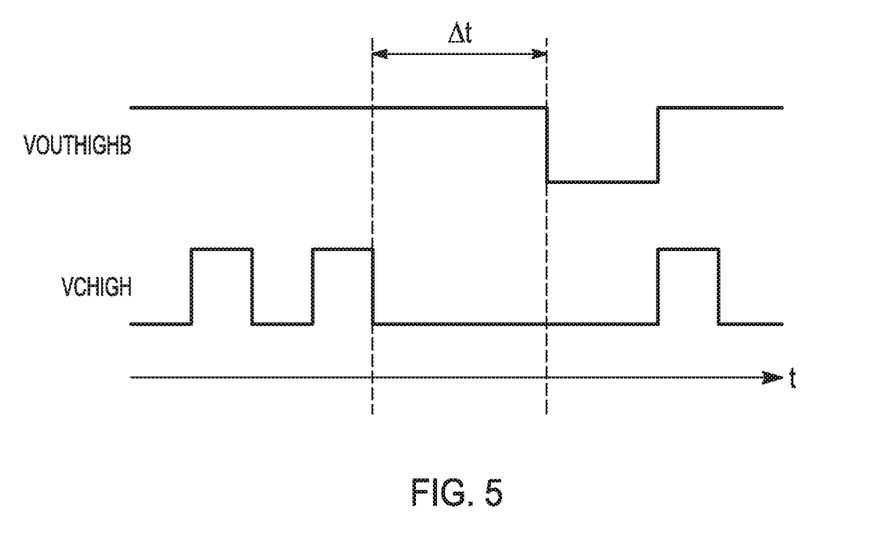
FIG. 5 is a timing diagram.

A timing diagram of the VOUTHIGHB signal and the VCHIGH signal are shown in FIG. 5. As seen in FIG. 5, the timer 162 outputs a logic-low control signal VOUTHIGHB when the output control signal VCHIGH of the comparator 155 remains low for a time duration Δt, which indicates Equation (1) is satisfied.

Equation (2) can be implemented by a comparator circuit 160. The comparator 160 can include a positive input terminal coupled to the input node and a negative input terminal coupled to the output node. A voltage offset 157 can be added between the input node $V_{IN}$ and the positive input terminal to make the comparison of the input voltage $V_{IN}$ and the output voltage $V_{OUT}$ more sensitive. In an alternative configuration (not depicted), the offset voltage can be added between the output node $V_{OUT}$ and the negative input terminal to make the negative terminal voltage lower than the output node voltage. The comparator 160 can compare the output voltage $V_{OUT}$ and the input node voltage, e.g., the sum of the input voltage $V_{IN}$ plus the voltage offset 157, and output a logic-high control signal VINHIGH when Equation (2) is satisfied.

When both Equation (1) and Equation (2) are satisfied, the S-R flip-flop 167 can output a logic-high pass-through control signal, namely PASSTHROUGH 168 (indicating that the regulator circuit has entered a pass-through operation) to OR gate 169. In response, the flip-flop 170 can turn the high-side switch 103 ON via the logic gate 132 and the driver circuit 110 while keeping the low-side switch 105 OFF.

At the same time, a buffer 161 can generate a SLEEP signal. The logic-high pass-through control signal PASSTHROUGH 168 causes the SLEEP signal to go high. The SLEEP signal is applied to various control circuits, such as the comparator 160, the comparator 152, the clock 136, the comparator 225, the slope compensation circuit 130, and the amplifier 107, causing these circuits to enter a sleep mode that reduces their respective quiescent currents. The gate voltage of the high-side switch 103 can be monitored by a voltage sensing circuit (not depicted) in pass-through operation, and a charge pump circuit 111 inside the driver circuit 110 can be turned ON to increase the gate voltage to a higher threshold voltage if it drops below a lower threshold voltage.

The pass-through operation can be accurately detected by a pass-through operation detection circuit that can include the timer 162, the comparator circuit 155, and the comparator circuit 160. The pass-through operation detection circuit can be responsive to the voltage control signal VC applied to the comparator circuit 155 and to the control signal VINHIGH generated by the comparator circuit 160. The pass-through detection circuit can generate control signal PASSTHROUGH that indicates that the circuit 50 has entered (e.g., logic-high signal) or exited (e.g., logic-low signal) a pass-through operation.

Using these techniques, the converter efficiency can be improved by keeping the high-side switch 103 ON and the quiescent current can be minimized by setting much of the control circuitry into sleep mode. During the pass-through operation, the output voltage $V_{OUT}$ can be constantly monitored by the feedback network 10 and EAMP 12. If the output voltage $V_{OUT}$ decreases below its regulation voltage $V_{OUT\_REG}$, the control voltage VC decreases and causes the signal VCHIGH to go high. The control signal VOUTHIGHB goes high and the flip-flop 167 turns the PASSTHROUGH control signal to a logic-low level (indicating that the regulator circuit has exited a pass-through operation). The logic-low PASSTHROUGH control signal causes the SLEEP signal to go low, which can wake up the corresponding circuits that were in SLEEP mode. The logic-low SLEEP signal can cause the clock 136 to output a signal to the flip-flop 135 to set the signal SWON to a logic-high level to turn the low-side switch 105 ON immediately. In this manner, the converter circuit 50 exits pass-through operation and enters its boost operation.

FIG. 5 is a timing diagram. In particular, the timing diagram in FIG. 5 depicts a relationship between the timer 162 output signal VOUTHIGHB and the output signal VCHIGH of the comparator 155 of FIG. 4. As seen in FIG. 5, the timer 162 outputs a logic-low signal VOUTHIGHB at 60 when the output signal VCHIGH of the comparator 155 remains low at 62 for a time duration Δt, which indicates Equation (1) is satisfied.

FIG. 6 is a schematic diagram of an example of a synchronous boost regulator circuit with accurate pass-through operation control, low quiescent current, and reverse inductor current protection. Some of the components in FIG. 6 are similar to components in FIG. 4 and, for purposes of conciseness, will not be described again. For example, a component labeled "2XX" in FIG. 6 can be an example of a component labeled "1XX" in FIG. 4. The boost regulator circuit 70 of FIG. 6 can include a boost circuit 200 and a pass-through operation control circuit 251. The boost circuit 200 can include an inductor L1, a high-side switch 203, and a low-side switch 205.

When Equation (2) is satisfied, the comparator 260 can output a logic-high signal to its pin 263 and to a pin 253 of the comparator 252. As a result, an input hysteresis can be applied to the comparator 260 via pin 263 and to the comparator 252 via pin 253 when the control signal VINHIGH is a logic-high level.

In a pass-through operation, the high-side switch 203 is ON. A sudden drop in the input voltage $V_{IN}$ can cause a reverse inductor current to begin flowing and increase, which can damage the voltage source and the load. This disclosure describes techniques to turn OFF the high-side switch and exit the pass-through operation when a sudden drop in the input voltage $V_{IN}$ occurs in order to protect the voltage source and the load.

When the output of either the comparator 260 or the comparator 252 is flipped due to a sudden drop in the input voltage $V_{IN}$, either the signal VINHIGH is a logic-low level or the signal IREVERSE is a logic-high level. As a result, the logic gate 258 can output a logic-high signal to the flip-flop 270. In response, the flip-flop 270 can turn the high-side switch 203 OFF (via the logic gate 232 and the driver circuit 210) to stop the reverse inductor current from flowing from the output node $V_{OUT}$ to the input node $V_{IN}$.

The hysteresis value of the comparator 260 can determine the input voltage $V_{IN}$ drop threshold that causes the high-side switch 203 to turn OFF to stop reverse inductor current from ramping up. The hysteresis value of the comparator 252 can determine the reverse current threshold of the high-side switch 203 that causes the switch 203 to turn OFF to stop the reverse inductor current. The logic-high output of the comparator 260 can clear the hysteresis of the comparator 260 and the comparator 252. When the high-side switch 203 is turned OFF, the comparator 252 is also turned OFF by the enable pin 256.

After the switch 203 is turned OFF due to the sudden drop in the input voltage $V_{IN}$, the input voltage $V_{IN}$ and the output voltage $V_{OUT}$ continue to be monitored by the comparator 260. The circuit 70 is back in its pass-through operation and the high-side switch 203 is turned ON when Equation (2) is satisfied again.

In contrast to the regulator circuit 50 shown in FIG. 4, the SLEEP signal in the regulator circuit 70 shown in FIG. 6 does not put either the comparator 152 or the comparator 160 into a sleep mode. Instead, the comparator 152 and the comparator 160 remain active to monitor the input node voltage, the output node voltage, and the inductor current. The SLEEP signal is applied to various control circuits, such as the clock 236, the comparator 225, the slope compensation circuit 230, and the amplifier 207, causing these circuits to enter a sleep mode that reduces quiescent current.

Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A synchronous boost regulator circuit with pass-through operation control and low quiescent current and to supply a current at a regulated voltage to an output node coupled to a load, the synchronous boost regulator circuit comprising:
    a power stage circuit coupled to supply the current to the output node, the power stage circuit including a low-side switch, a high-side switch, and an inductor;
    a first comparator configured to compare a representation of an input node voltage and an output node voltage to generate a first control signal;
    an error amplifier configured to receive a representation of the output node voltage and generate a current control signal to control an inductor current so as to maintain the output node at the regulated voltage; and
    a pass-through operation control circuit configured to control the high-side switch, the pass-through operation control circuit including:
        pass-through operation detection circuitry responsive to the first control signal and the current control signal and configured to generate a pass-through control signal indicating that the regulator circuit has entered or exited a pass-through operation; and
        sleep mode circuitry configured to receive the pass-through control signal and generate a sleep mode signal that causes at least one component to enter and exit a sleep mode, wherein entering the sleep mode reduces a quiescent current of the at least one component.

2. The regulator circuit of claim 1, further comprising a second comparator configured to monitor the inductor current either by determining a voltage drop across a sense resistor connected in series with the inductor or by determining a voltage drop across the high-side switch.

3. The regulator circuit of claim 1, further comprising a third comparator configured to compare the current control signal to a threshold voltage and generate a second control signal that indicates whether the output node voltage is higher than the regulated voltage.

4. The regulator circuit of claim 3, further comprising a first logic circuit and a timer circuit, the timer circuit configured to receive the second control signal and determine when the second control signal is at a first logic level for a period of time, wherein the first logic circuit is configured to change a state of the pass-through control signal to indicate that the regulator circuit has entered the pass-through operation when the first control signal is at a second logic level and when the second control signal is at the first logic level for the period of time.

5. The regulator circuit of claim 4, further comprising a driver circuit responsive to the pass-through control signal and configured to output at least one signal to keep the high-side switch ON and the low-side switch OFF when the regulator circuit has entered the pass-through operation.

6. The regulator circuit of claim 4, wherein the first logic circuit is configured to change the state of the pass-through control signal to indicate that the regulator circuit has exited the pass-through operation when the second control signal changes to the second logic level.

7. The regulator circuit of claim 6, wherein when the pass-through control signal changes state to indicate that the regulator circuit has exited the pass-through operation, the sleep mode circuitry is configured to clear the sleep mode signal to cause the at least one component to exit the sleep mode.

8. The regulator circuit of claim 1, further comprising a second comparator configured to monitor the inductor current, wherein the first comparator and the second comparator are configured to receive the sleep mode signal.

9. The regulator circuit of claim 1, further comprising a second comparator configured to monitor the inductor current,
    wherein when the at least one component enters the sleep mode, the first comparator and the second comparator remain active to monitor the input node voltage, the output node voltage, and the inductor current.

10. The regulator circuit of claim 9, wherein the second comparator is configured to generate a feedback signal, the circuit further comprising:
    a second logic circuit configured to receive the first control signal and the feedback signal, wherein when the first control signal is a first logic level or when the feedback signal is second logic level high, the second logic circuit is configured to output a signal to turn OFF the high-side switch to stop an inductor reverse current ramping up.

11. The regulator circuit of claim 1, further comprising a second comparator configured to monitor the inductor current, wherein at least one of the first comparator and the second comparator is configured to add an input hysteresis based on the first control signal.

12. The regulator circuit of claim 1, further comprising:
    a driver circuit including a charge pump and configured to control a gate voltage to the high-side switch, wherein when the regulator circuit has entered the pass-through operation, the charge pump circuit is configured to turn ON to increase the gate voltage to the high-side switch to a higher threshold when the gate voltage drops below a lower threshold.

13. A method of supplying a current at a regulated voltage to an output node coupled to a load using a synchronous boost regulator circuit with pass-through operation control and low quiescent current, the method comprising:
supplying the current to the output node using a power stage circuit including a low-side switch, a high-side switch, and an inductor;
comparing a representation of an input node voltage and an output node voltage and generating a first control signal;
receiving a representation of the output node voltage and generating a current control signal to control an inductor current so as to maintain the output node at the regulated voltage;
generating a pass-through control signal indicating that the regulator circuit has entered or exited a pass-through operation using the first control signal and the current control signal; and
generating a sleep mode signal using the pass-through control signal to cause at least one component to enter and exit a sleep mode, wherein the sleep mode reduces a quiescent current of the at least one component.

14. The method of claim 13, further comprising;
in response to the pass-through control signal indicating that the regulator circuit has entered the pass-through operation, outputting at least one signal to keep the high-side switch ON and the low-side switch OFF.

15. The method of claim 14, wherein when the regulator circuit has entered the pass-through operation, controlling a charge pump circuit to turn ON to increase a gate voltage to the high-side switch to a higher threshold when the gate voltage drops below a lower threshold.

16. The method of claim 13, further comprising:
adding an input hysteresis based on the first control signal to at least one of a first comparator and a second comparator.

17. The method of claim 13, further comprising:
in response to the pass-through control signal indicating that the regulator circuit has exited the pass-through operation, the sleep mode circuitry is configured to output the sleep mode signal to cause the at least one component to exit the sleep mode.

18. The method of claim 13, further comprising:
generating a signal to turn OFF the high-side switch to stop an inductor reverse current ramping up when the regulator is in the pass-through operation and when the input voltage decreases.

19. A synchronous boost regulator circuit with pass-through operation control and low quiescent current and to supply a current at a regulated voltage to an output node coupled to a load, the synchronous boost regulator circuit comprising:
a power stage circuit coupled to supply the current to the output node, the power stage circuit including a low-side switch, a high-side switch, and an inductor;
a first comparator configured to compare a representation of an input node voltage and an output node voltage to generate a first control signal;
an error amplifier configured to receive a representation of the output node voltage and generate a current control signal to control an inductor current so as to maintain the output node at the regulated voltage;
means for generating a pass-through control signal indicating that the regulator circuit has entered or exited a pass-through operation using the first control signal and the current control signal; and
means for generating a sleep mode signal using the pass-through control signal to cause at least one component to enter and exit a sleep mode, wherein the sleep mode reduces a quiescent current of the at least one component.

20. The synchronous boost regulator circuit of claim 19, wherein when the pass-through control signal changes state to indicate that the regulator circuit has exited the pass-through operation, the means for generating the sleep mode signal is configured to clear the sleep mode signal to cause the at least one component to exit the sleep mode.

* * * * *